US006400091B1

(12) United States Patent
Deguchi et al.

(10) Patent No.: US 6,400,091 B1
(45) Date of Patent: Jun. 4, 2002

(54) ELECTRON EMISSION ELEMENT AND IMAGE OUTPUT DEVICE

(75) Inventors: Masahiro Deguchi, Osaka; Makoto Kitabatake, Nara; Kanji Imai, Osaka; Tomohiro Sekiguchi, Hyogo; Hideo Kurokawa, Osaka; Keisuke Koga, Kyoto; Tetsuya Shiratori; Toru Kawase, both of Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/525,546

(22) Filed: Mar. 14, 2000

(30) Foreign Application Priority Data

Mar. 18, 1999 (JP) ........................................... 11-073334

(51) Int. Cl.[7] ............................................. G09G 3/10
(52) U.S. Cl. .............................. 315/169.1; 315/169.4; 313/495
(58) Field of Search .......................... 315/169.1, 169.3, 315/169.4; 313/74, 292, 495

(56) References Cited

U.S. PATENT DOCUMENTS

| 5,709,577 A | | 1/1998 | Jin et al. ...................... 445/24 |
| 5,747,927 A | * | 5/1998 | Namikawa et al. ......... 313/495 |
| 5,796,211 A | | 8/1998 | Graebner et al. ............ 315/3.5 |
| 5,821,679 A | | 10/1998 | Makishima .................. 313/310 |
| 5,965,978 A | * | 10/1999 | Kishino et al. ............. 313/496 |
| 5,977,697 A | | 11/1999 | Jin et al. ..................... 313/310 |
| 6,072,278 A | * | 6/2000 | Keyser et al. ............ 315/169.1 |
| 6,100,641 A | * | 8/2000 | Baranov et al. ......... 315/169.1 |
| 6,133,893 A | * | 10/2000 | Maslennikov et al. ........ 345/74 |

FOREIGN PATENT DOCUMENTS

| EP | 520 780 | 12/1992 | ............. H01J/9/02 |
| EP | 660 368 | 6/1995 | ............. H01J/31/12 |
| EP | 0 905 737 A1 | 3/1999 | ............. H01J/1/30 |
| JP | 10-92294 | 4/1998 | ............. H01J/1/30 |
| JP | 11-111158 | 4/1999 | ............. H01J/1/30 |
| WO | WO 94/15352 | 7/1994 | ............. H01J/19/24 |

OTHER PUBLICATIONS

European Search Report.
"Fabrication of Silicon Field Emitter Arrays Integrated with Beam Focusing Lens" (Yoshikazu Yamaoka et al., Dec. 1996).
"Fabrication of encapsulated silicon–vacuum field–emission transistors and diodes" (C.T. Sune et al., Dec. 1992).
"Electron Field Emitters Based on Carbon Nanotube Films" (Walt A. De Heer et al., Jan. 1997).

\* cited by examiner

*Primary Examiner*—Don Wong
*Assistant Examiner*—Jimmy T. Vu
(74) *Attorney, Agent, or Firm*—Merchant & Gould PC

(57) ABSTRACT

An electron emission element of the present invention includes a substrate, a cathode formed on the substrate, an anode opposed to the cathode, an electron emission member disposed on the cathode, and a control electrode disposed between the cathode and the anode. During operation, the electric field intensity immediately above the electron emission member is lower than that between the control electrode and the anode. Alternatively, the spatial average of an electric field intensity between the electron emission member and the control electrode is smaller than that between the control electrode and the anode.

30 Claims, 7 Drawing Sheets

ELECTRON EMISSION ELEMENT AND IMAGE OUTPUT DEVICE

BACKGROUND OF THE INVENTION

1. Field of the Invention

The present invention relates to an electron emission element and an image output device. The electron emission element of the present invention is applicable to, for example, an electron beam source for a thin display or an emitter portion of a vacuum device.

2. Description of the Related Art

In recent years, as an electron beam source for a flat display, and as an emitter portion of a vacuum device that can be operated at high speed, a cold cathode electron source has been considered. There are various types of cold cathode electron sources. In particular, a field emission (FE)-type, a tunnel injection (MIM, MIS)-type, a surface conduction (SC)-type, and the like are known.

In an FE-type electron source, an electric field is applied to a cone-shaped projection (electron emission portion) made of silicon (Si), molybdenum (Mo), or the like, whereby electrons are emitted from the top of the projection. In an SC-type electron source, an electric current is allowed to flow in an in-plane direction of a thin film formed on a substrate, whereby electrons are partially taken out of a previously formed crack portion in the thin film. Furthermore, in MIM-type and MIS-type electron sources, a layered structure (e.g., metal/insulator/metal (or semiconductor)) is formed, and electrons are injected through the metal side, and the injected electrons are partially taken out of an electron emission portion. The MIM-type and MIS-type electron sources have problems in that an element is likely to generate heat, electron emission characteristics become unstable, and element life becomes short.

The above-mentioned elements are advantageous in that they can be minimized and integrated by using fine processing technology. These elements also are advantageous in that heating is not required, unlike a hot cathode electron source.

FIG. 5 shows an example of an FE-type electron emission element. Referring to FIG. 5, a conventional electron emission element 1 includes a substrate 2, a cathode 3 formed on the substrate 2, a cone-shaped electron emission member 4 disposed on the cathode 3, an anode 5 opposed to the cathode 3, a control electrode 6 disposed between the cathode 3 and the anode 5, and an insulating layer 7 supporting the control electrode 6. Furthermore, FIG. 6 schematically shows an equipotential surface 8 between the cathode 3 and the anode 5 and a path 9 of emitted electrons during operation.

In the FE-type electron emission element, a high electric field is applied between the electron emission member and the control electrode, whereby electrons are emitted. The emitted electrons are accelerated by an electric field (lower than that between the electron emission member and the control electrode) between the anode and the control electrode, thereby reaching the surface of the anode. When the above-mentioned electron emission element is used for a flat display, a phosphor film is formed on the surface of the anode, and the emitted electrons cause the phosphor film to emit light.

In this case, in order to allow the electron emission member made of Si, Mo, or the like to emit electrons, a very high electric field is required. Accordingly, in the conventional electron emission element, the electric field intensity between the electron emission member and the control electrode is prescribed to be much larger than that between the anode and the control electrode.

A high electric field intensity between the electron emission member and the control electrode is obtained by applying a voltage therebetween. On the other hand, in order to prevent breakdown between the electrodes, it is very difficult to apply a high voltage between the electron emission member and the control electrode. Therefore, it is required to control the distance between the electron emission member and the control electrode in a minute region so as to obtain a high electric field at a low voltage. Therefore, there is a problem that the conventional electron emission element is difficult to produce.

Furthermore, as shown in FIG. 6, in the conventional electron emission element 1, the equipotential surface 8 is convex toward the anode 5. Therefore, while moving toward the anode 5, a group of emitted electrons have their path 9 bent and are diffused. However, diffusion of electron beams is not preferable for a flat display with minute pixels. Because of this, when the conventional electron emission element 1 is applied to a display, it is required to add a focusing electrode for preventing diffusion of electron beams. The addition of such a focusing electrode complicates the structure of a display, which leads to a decrease in production yield and an increase in production cost.

SUMMARY OF THE INVENTION

Therefore, with the foregoing in mind, it is an object of the present invention to provide an electron emission element that is capable of emitting highly focused electrons and is produced easily, and an image output device using the same.

In order to achieve the above-mentioned object, the first electron emission element of the present invention includes: a cathode; an anode opposed to the cathode; an electron emission member disposed on the cathode; and a control electrode disposed between the cathode and the anode, wherein, during operation, the electric field intensity immediately above the electron emission member is lower than that between the control electrode and the anode. In the present specification, "immediately above the electron emission member" refers to a space above the electron emission member and below the control electrode. Furthermore, in order to achieve the above-mentioned object, the second electron emission element of the present invention includes: a cathode; an anode opposed to the cathode; an electron emission member disposed on the cathode; and a control electrode disposed between the cathode and the anode, wherein, during operation, a spatial average of the electric field intensity between the electron emission member and the control electrode is lower than that between the control electrode and the anode. In the first and second electron emission elements, electrons are emitted due to an electric field formed by a voltage applied between the electron emission member and the anode, and the amount of electrons to be emitted is controlled by the control electrode disposed between the electron emission member and the anode. Therefore, in the first and second electron emission elements, the distance between the electron emission member and the control electrode is not required to be minute. Accordingly, the electron emission element of the present invention is produced easily.

In the first and second electron emission elements, a voltage required for the electron emission member to emit electrons is applied between the electron emission member and the anode, and emission of electrons from the electron emission member is controlled by changing an electric potential of the control electrode. According to this structure, the emission of electrons from the electron emission member can be controlled easily. Herein, the voltage required for the electron emission member to emit electrons refers to the value of a voltage at which electrons are emitted from the electron emission member irrespective of the presence or absence of the control electrode. Furthermore, it is preferable that, while the emission amount of electrons is controlled by the control electrode (i.e., during operation of the device), a spatial average of the electric field intensity between the electron emission member and the control electrode is ½ or less (more preferably ⅓) of that between the anode and the control electrode.

In the first and second electron emission elements, it is preferable that, during emission of electrons, an equipotential surface in a space immediately above the electron emission member has a curvature that is convex toward the electron emission member. According to this structure, an electron emission element can be obtained that emits highly focused electrons.

In the first and second electron emission elements, it is preferable that the electron emission member is a thin film. According to this structure, a projection at which an electric field is concentrated is not used, so that an equipotential surface with a curvature that is convex toward the electron emission member is formed easily.

In the first and second electron emission elements, it is preferable that the electron emission member contains an allotrope of carbon (C). According to this structure, an electron emission element with a high electron emission ability can be obtained.

In the first and second electron emission elements, it is preferable that the allotrope includes diamond. According to this structure, an electron emission element with a particularly high electron emission ability can be obtained. In this case, when the diamond has a region that is terminated with hydrogen on its surface, an electron emission element can be obtained that is stable and has a much higher electron emission ability.

In the first and second electron emission elements, it is preferable that the allotrope includes an allotrope of carbon having a graphene structure. According to this structure, an electron emission element with a particularly high electron emission ability can be obtained.

In the first and second electron emission elements, it is preferable that the allotrope includes a carbon nanotube. According to this structure, an electron emission element with a particularly high electron emission ability can be obtained.

The first image output device of the present invention includes a substantially vacuum container and a plurality of electron emission elements disposed in a matrix in the container, wherein the electron emission element is the above-mentioned first electron emission element, and the device further includes a phosphor film disposed between the electron emission members and the anode. The second image output device of the present invention includes a substantially vacuum container and a plurality of electron emission elements disposed in a matrix in the container, wherein the electron emission element is the above-mentioned second electron emission element, and the device further includes a phosphor film disposed between the electron emission members and the anode. Since the first and second image output devices include the electron emission element of the present invention, they can be produced easily, and enable a high-resolution image to be displayed.

In the first and second image output devices, it is preferable that a voltage required for the electron emission member to emit electrons is applied between the electron emission member and the anode, and emission of electrons from the electron emission member is controlled by changing an electric potential of the control electrode. Furthermore, it is preferable that, while the emission amount of electrons is controlled by the control electrode (i.e., during operation of the device), a spatial average of the electric field intensity between the electron emission member and the control electrode is ½ or less (more preferably ⅓) of that between the anode and the control electrode.

In the first and second image output devices, it is preferable that, during emission of electrons, an equipotential surface in a space immediately above the electron emission member has a curvature that is convex toward the electron emission member.

In the first and second image output devices, it is preferable that the electron emission member is a thin film.

In the first and second image output devices, it is preferable that the electron emission member contains an allotrope of carbon (C).

In the first and second image output devices, it is preferable that the allotrope includes diamond.

In the first and second image output devices, it is preferable that the allotrope includes an allotrope of carbon having a graphene structure.

In the first and second image output devices, it is preferable that the allotrope includes a carbon nanotube.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative embodiments with reference to the drawings.

Embodiment 1

Figure 1A:
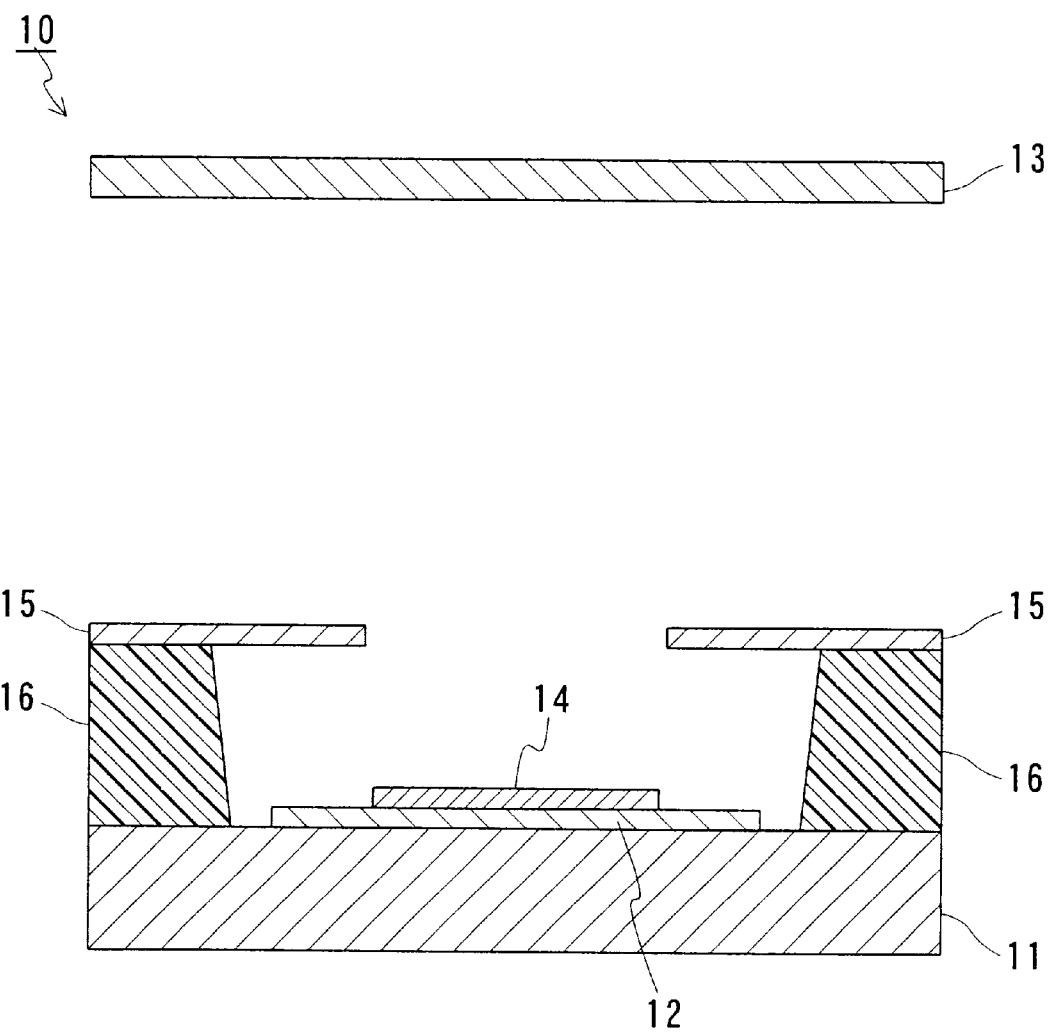
FIG. 1A is a cross-sectional view showing an example of an electron emission element according to the present invention.
Figure 1B:
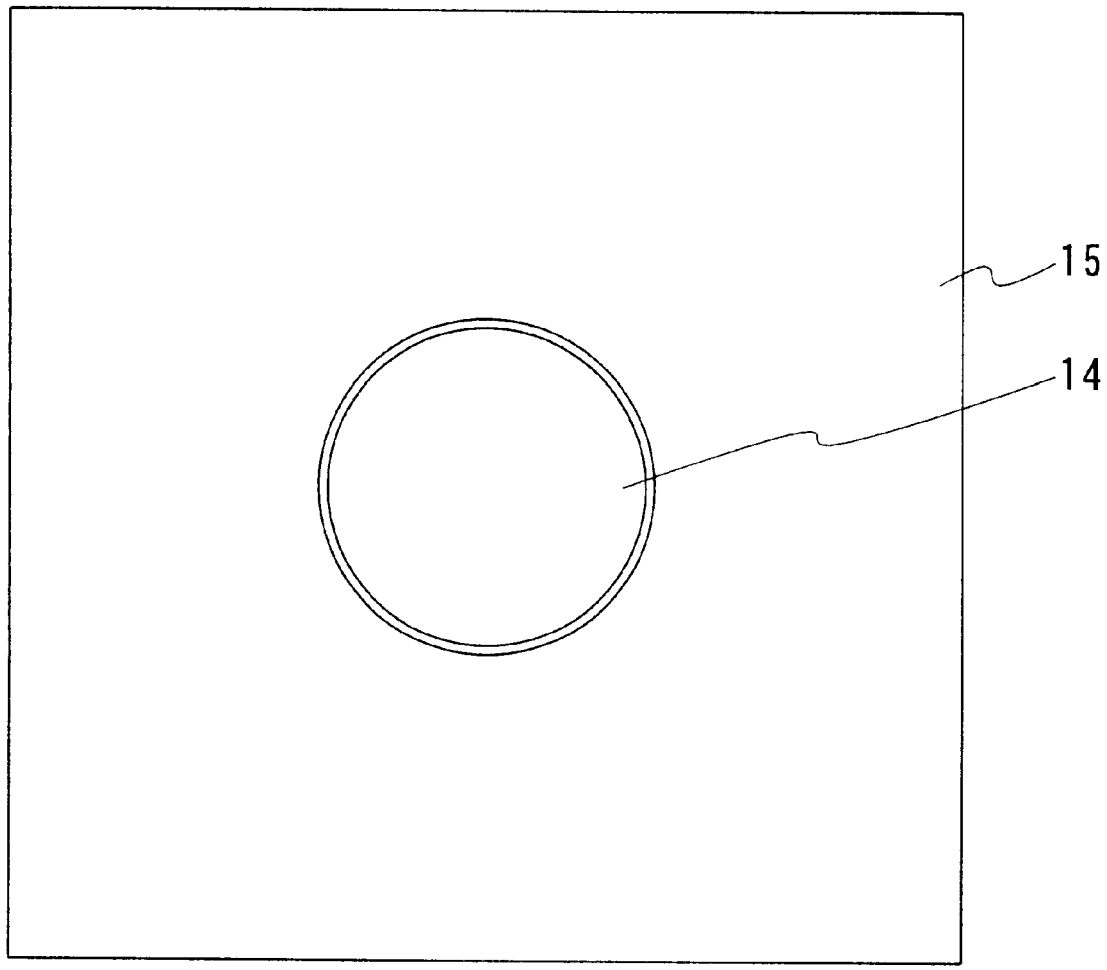
FIG. 1B is a partial plan view of the electron emission element shown in FIG. 1.

An electron emission element of Embodiment 1 according to the present invention will be described. FIG. 1A is a cross-sectional view of an electron emission element 10 of Embodiment 1. FIG. 1B is a plan view in which a substrate 11 is seen from an anode 13.

Referring to FIGS. 1A and 1B, the electron emission element 10 includes a cathode 12 formed on a substrate 11, an anode 13 opposed to the cathode 12, an electron emission element 14 disposed on the cathode 12, a control electrode 15 disposed between the cathode 12 and the anode 13, and an insulating layer 16 supporting the control electrode 15.

The substrate 11 can be made of, for example, glass, quartz, or silicon.

The cathode 12 supplies electrons to the electron emission member 14. The cathode 12 also is used for forming an electric field between the cathode 12 and the anode 13. The cathode 12 can be made of a low-resistance material such as metal (e.g., Al, Ti, or W) and polycrystalline Si. The cathode 12 also can be made of a layered structure of metal and a low-resistance material, whereby an electric current supplied to the electron emission member 14 can be controlled. In the case where a conductive material is used for the substrate 11, the cathode 12 may be omitted.

The anode 13 may be made of, for example, a metal plate (e.g., Al plate, Mo plate, Cu plate, etc.) or may be made of a metal film formed on a substrate. Alternatively, the anode 13 may be made of a transparent conductive film (e.g., ITO, etc.) formed on a substrate. The anode 13 cooperates with the cathode 12 to form an electric field, thereby allowing the electron emission element 14 to emit electrons. The anode 13 also is used for accelerating and collecting emitted electrons.

The electron emission member 14 emits electrons due to an applied electric field. The electron emission member 14 is electrically connected to the cathode 12. The electrons emitted from the electron emission member 14 are moved to the anode 13 due to an electric field formed by the cathode 12, the anode 13, and the control electrode 15. The electron emission member 14 is formed as a circular thin film, for example, as shown in FIGS. 1A and 1B. Alternatively, the electron emission member 14 may be formed into a cone shape.

The control electrode 15 controls the emission of electrons from the electron emission member 14. The control electrode 15 is generally disposed in the vicinity of the electron emission member 14 and between the electron emission member 14 and the anode 13. The control electrode 15 is formed so as to easily control emission of electrons from the electron emission member 14. More specifically, the control electrode 15 has a circular aperture, for example, as shown in FIG. 1B. The On/Off state of emission of electrons and an emission amount of electrons can be controlled by changing the electric potential of the control electrode 15. The control electrode 15 can be made of, for example, metal such as Mo and Al. The control electrode 15 is formed on the insulating layer 16.

The insulating layer 16 fixes the position of the control electrode 15 and electrically insulates the cathode 12 from the control electrode 15. The insulating layer 16 can be made of, for example, silicon dioxide ($SiO_2$) and silicon nitride (SiN).

Hereinafter, the electron emission member 14 will be described in detail.

In the electron emission element 10, electrons are emitted by applying a voltage between the electron emission member 14 and the anode 13. Therefore, the electron emission member 14 contains a material that is likely to emit electrons. More specifically, the electron emission member 14 preferably contains an allotrope of carbon (C).

Preferable examples of a carbon allotrope include those which have a graphene structure made of a six-membered ring of carbon, and diamond. Examples of an allotrope having a graphene structure include graphite and a carbon nanotube. These allotropes are likely to emit electrons, so that an electron emission element obtained by using these allotropes has a high electron emission ability. For example, a diamond surface exhibits a negative electron affinity. Among the allotropes of carbon having a graphene structure, a carbon nanotube is most likely to emit electrons.

The diamond used for the electron emission member 14 is preferably in the shape of a thin film or a cluster of particles. When being made of diamond having a thin film shape, the electron emission member 14 can be formed in any shape at any position by photolithography or the like. Furthermore, even when being made of diamond having a particle shape, the electron emission member 14 can be formed in any shape at any position, for example, by printing a solution in which diamond particles are dispersed.

The mean particle diameter of diamond particles used for the electron emission member 14 is preferably 10 nm to 0.1 mm, and more preferably 100 nm to 10 μm. By using diamond particles with a mean particle diameter of 10 nm or more, the electron emission member 14 can be produced easily. Furthermore, the electron emission member 14 made of diamond particles with a mean particle diameter of 0.1 mm or less can be used for a display containing minute pixels.

Furthermore, the diamond used for the electron emission member 14 preferably has a region terminated with hydrogen (H) on its surface. The electron affinity of diamond is closely related to the state of its surface. If the surface of diamond is terminated with hydrogen, the electron affinity on the diamond surface can be rendered negative. Thus, according to the above-mentioned structure, an electron emission element with a high electron emission ability can be obtained.

In the case where the electron emission member 14 contains carbon nanotubes, the content thereof is preferably 1% by volume or more. Because of this, an electron emission element is obtained that is capable of emitting electrons sufficient for practical use.

In the case of containing carbon nanotubes, the electron emission member 14 may further contain a material that does not react with the carbon nanotubes. Because of this structure, the content of carbon nanotubes can be controlled, and carbon nanotubes can be prevented from being denatured. Specifically, it is preferable that the electron emission member 14 further contains at least one selected from the group consisting of graphite, fullerene, diamond, and diamond-like carbon, in addition to carbon nanotubes. It is also preferable that the electron emission member 14 further contains at least one carbide selected from the group consisting of tungsten (W), molybdenum (Mo), chromium (Cr), tantalum (Ta), niobium (Nb), vanadium (V), zirconium (Zr), titanium (Ti), nickel (Ni), boron (B), and silicon (Si), in addition to carbon nanotubes. Furthermore, it is preferable that the electron emission member 14 further contains gold (Au), silver (Ag), copper (Cu), platinum (Pt), and aluminum (Al), in addition to carbon nanotubes.

Furthermore, the electron emission member 14 preferably contains a material having a fibrous shape. The term "fibrous shape" as used herein refers to a material containing a number of elongated components with a high aspect ratio, and the respective longitudinal directions of the components are arranged substantially in one direction. Examples of the fibrous material include a carbon fiber and an aggregate of whisker structures. Because of this structure, an electric field is concentrated at an end of the material having a fibrous shape; as a result, electrons are emitted even with a low electric field intensity. In particular, it is preferable that the material having a fibrous shape is an allotrope of carbon.

In one electron emission element 10, the electric field intensity immediately above the electron emission member 14 is smaller than that between the control electrode 15 and the anode 13 during operation. In another electron emission element 10, the spatial average of an electric field intensity between the electron emission member 14 and the control electrode 15 is smaller than that between the control electrode 15 and the anode 13. More specifically, a voltage required for the electron emission member 14 to emit electrons is applied between the electron emission member 14 and the anode 13. In the electron emission element 10, the electric potential of the control electrode 15 is changed, and the electric field intensity that acts on the electron emission member 14 is decreased, whereby the emission of electrons from the electron emission member 14 is suppressed/controlled.

Figure 2:
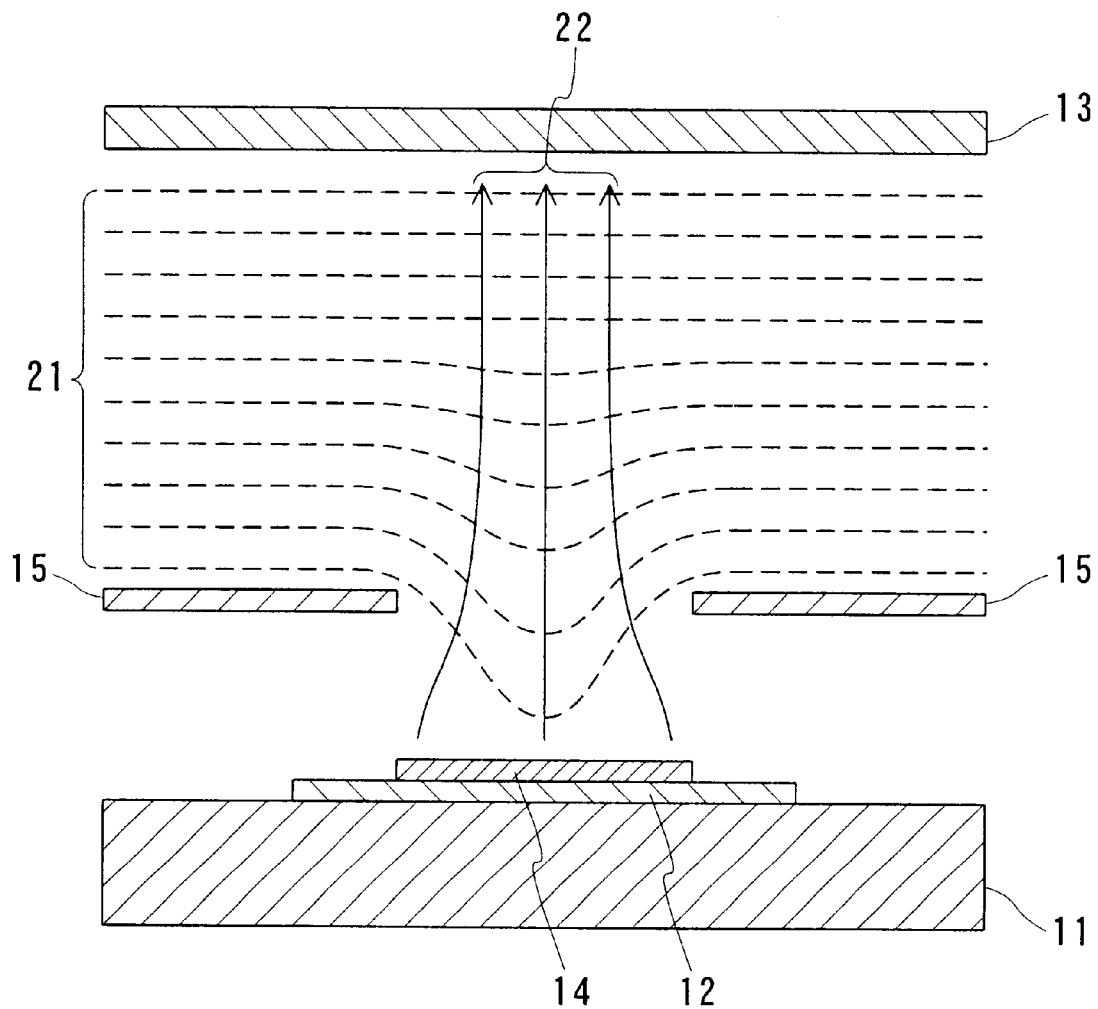
FIG. 2 is a schematic view showing a function of the electron emission element shown in FIG. 1.

The electric field intensity as described above can be realized by changing the positions, shapes and electric potentials of the electron emission member 14, the control electrode 15, and the anode 13. FIG. 2 schematically shows an equipotential surface 21 and a path 22 of emitted electrons in the case where the electron emission member 14 emits electrons. At this time, the electric potentials of the anode 13, the electron emission member 14, and the control electrode 15 are, for example, 10 kV, 0 V, and 0.1 kV, respectively. The optimum values of these electric potentials are varied depending upon the position of each electrode and the material for the electron emission member 14. The electron emission member 14 and the cathode 12 are substantially at the same electric potential.

As shown in FIG. 2, in the electron emission element 10, a voltage to be applied between the electron emission member 14 and the control electrode 15 is set at an appropriate value, whereby the equipotential surface 21 in a space immediately above the electron emission member 14 has a convex curvature toward the electron emission member 14 during emission of electrons. In other words, the equipotential surface 21 in the space immediately above the electron emission member 14 is concave on the anode 13 side. In this case, electrons emitted from the electron emission member 14 are focused by a generated electric field. Thus, the electron emission element 10 is capable of emitting electron beams that are focused satisfactorily. Therefore, the electron emission element 10 is useful for a high-resolution flat display.

In the case where the electric potential of the control electrode 15 is set at −0.1 kV, for example, in the electron emission element 10 shown in FIG. 2, an electric field to be applied to the electron emission member 14 is weakened, and electrons are not emitted from the electron emission member 14. Furthermore, by changing the electric potential of the control electrode 15 in a range of −0.1 kV to 0.1 kV, for example, the amount of electrons to be emitted can be controlled.

According to another aspect, in the electron emission element 10, during operation, a space between the electron emission member 14 and the control electrode 15 includes a region having an electric field intensity lower than that between the anode 13 and the control electrode 15.

In the electron emission element 10 of Embodiment 1, a high voltage is applied between the electron emission member 14 and the anode 13, and the electric potential of the control electrode 15 is changed slightly, whereby emission of electrons from the electron emission member 14 can be controlled. Thus, unlike a conventional electron emission element in which emission of electrons is controlled by applying a high electric field between the electron emission member 14 and the control electrode 15, the distance between the electron emission member 14 and the control electrode 15 is not required to be minute. Furthermore, in the electron emission element 10, the conditions required for preventing breakdown between the electron emission member 14 and the control electrode 15 can be alleviated remarkably. Thus, the electron emission element 10 is obtained, which emits highly focused electrons and is produced easily.

According to still another aspect, the present invention relates to a method for controlling an electron emission element including a cathode, an anode opposed to the cathode, an electron emission member disposed on the cathode, and a control electrode disposed between the cathode and the anode, wherein the electric field intensity immediately above the electron emission member is set to be smaller than that between the control electrode and the anode during operation. Alternatively, the present invention relates to a method for controlling the above-mentioned electron emission element, wherein the spatial average of an electric field intensity between the electron emission member and the control electrode is set to be smaller than that between the control electrode and the anode. According to these methods, a voltage required for the electron emission member to emit electrodes is applied between the electron emission member and the anode, and the electric potential of the control electrode is changed, whereby emission of electrons from the electron emission member is controlled. An electron emission element used in these methods is produced easily. Furthermore, according to these methods, electrons to be emitted can be highly focused.

Embodiment 2

Figure 3:
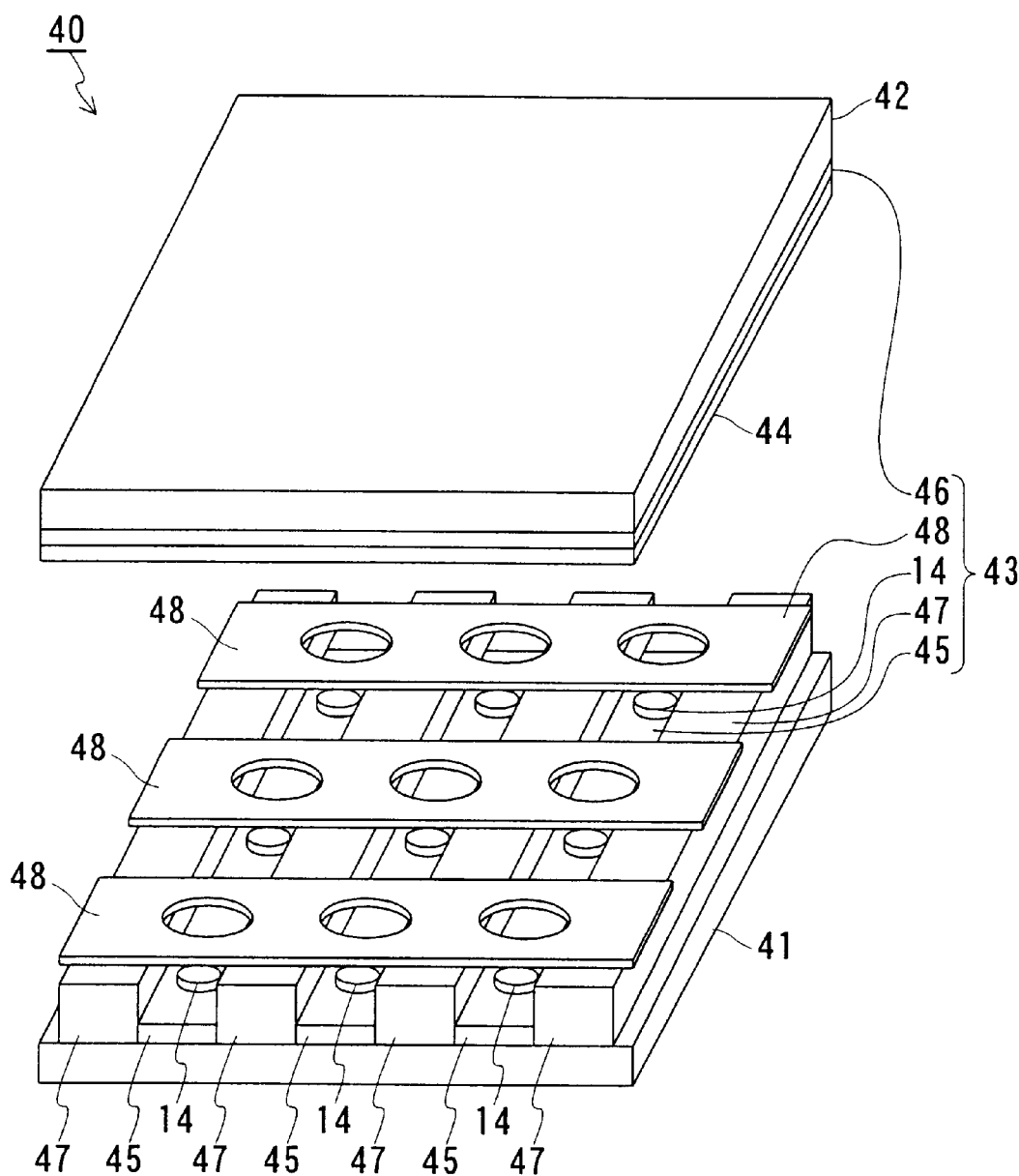
FIG. 3 is an exploded perspective view showing an example of an image output device according to the present invention.

In Embodiment 2, an example of an image output device of the present invention will be described. FIG. 3 is a schematic exploded perspective view of an image output device 40 of Embodiment 2.

Referring to FIG. 3, the image output device 40 includes a first substrate 41, a second substrate 42 opposed to the first substrate 41, a plurality of electron emission elements 43 disposed between the first substrate 41 and the second substrate 42, and a phosphor film 44 disposed on the second substrate 42. Each light emission element 43 corresponds to the one described in Embodiment 1. More specifically, each electron emission element 43 includes a cathode 45 disposed on the first substrate 41, an electron emission member 14 disposed on the cathode 45, an anode 46 formed on the second substrate 42, an insulating layer 47, and a control electrode 48 formed on the insulating layer 47. Herein, the cathode 45 is composed of a plurality of cathodes 12 arranged in parallel. Similarly, the control electrode 48 is composed of a plurality of control electrodes 15 arranged in parallel so as to cross the cathodes 45. The anode 46 is made of a material similar to that of the anode 13. The phosphor film 44 is disposed between the electron emission members 14 and the anode 46. As is common in the field of the cathode-ray tube (CRT), a metal back layer and the like may be formed on the phosphor film 44. The metal back layer mirror-reflects a part of the light emitted from the phosphor film 44, thereby enhancing a light utilization ratio. Furthermore, the metal back layer can protect the phosphor film 44 from collision with negative ions.

The image output device 40 further includes a side wall (not shown) formed on an outer edge of the first substrate 41 and the second substrate 42. In the image output device 40, a space formed by the first substrate 41, the second substrate 42, and the side wall has an airtight structure, and hence, a substantially vacuum state can be maintained. More specifically, the image output device 40 includes a plurality of electron emission elements disposed in the airtight container. The substantially vacuum state of the airtight container can be achieved by sealing a connecting portion of each component member, for example, with frit glass, and further exhausting the airtight container. More specifically, the above-mentioned airtight container is assembled; thereafter, an exhaust pipe and a vacuum pump are connected to the airtight container, and the airtight container is exhausted to about $10^{-7}$ Torr. Then, the exhaust pipe is sealed. At this time, it is preferable that a getter film, for example, containing barium as its main component, is formed at a predetermined position in the airtight container. By forming a getter film, a vacuum degree in the vacuum container can be maintained at $1 \times 10^{-5}$ Torr to $1 \times 10^{-7}$ Torr even after the airtight container is sealed.

Next, the arrangement of the electron emission elements 43 will be described. On the first substrate 41, n columns (n is an integer of 2 or more, and is determined in accordance with the number of intended display pixels.

In FIG. 3, n=3) of cathodes 45 are arranged. On the insulating layers 47, m rows (m is an integer of 2 or more, and is determined in accordance with the number of intended display pixels. In FIG. 3, m=3) of the control electrodes 48 are disposed so as to cross the cathodes 45. On the cathodes 45, n×m electron emission members 14 are disposed in a matrix at positions where n columns (cathodes 45) in the column direction cross m rows (control electrodes 48) in the row direction.

In the case where a monochrome display is performed by using the image output device 40, one kind of fluorescent substance should be used for the phosphor film 44. Furthermore, in the case where a color display is performed by using the image output device 40, it is required to use a plurality of kinds of fluorescent substances (e.g., fluorescent substances corresponding to three primary colors of red, green, and blue used in the field of CRTs) for the phosphor film 44. In this case, generally, a fluorescent substance corresponding to each color is formed in a stripe shape, and a black conductor (graphite, etc.) is formed between the stripes of the fluorescent substances of the respective colors, for the purpose of preventing a decrease in contrast.

Figure 4:
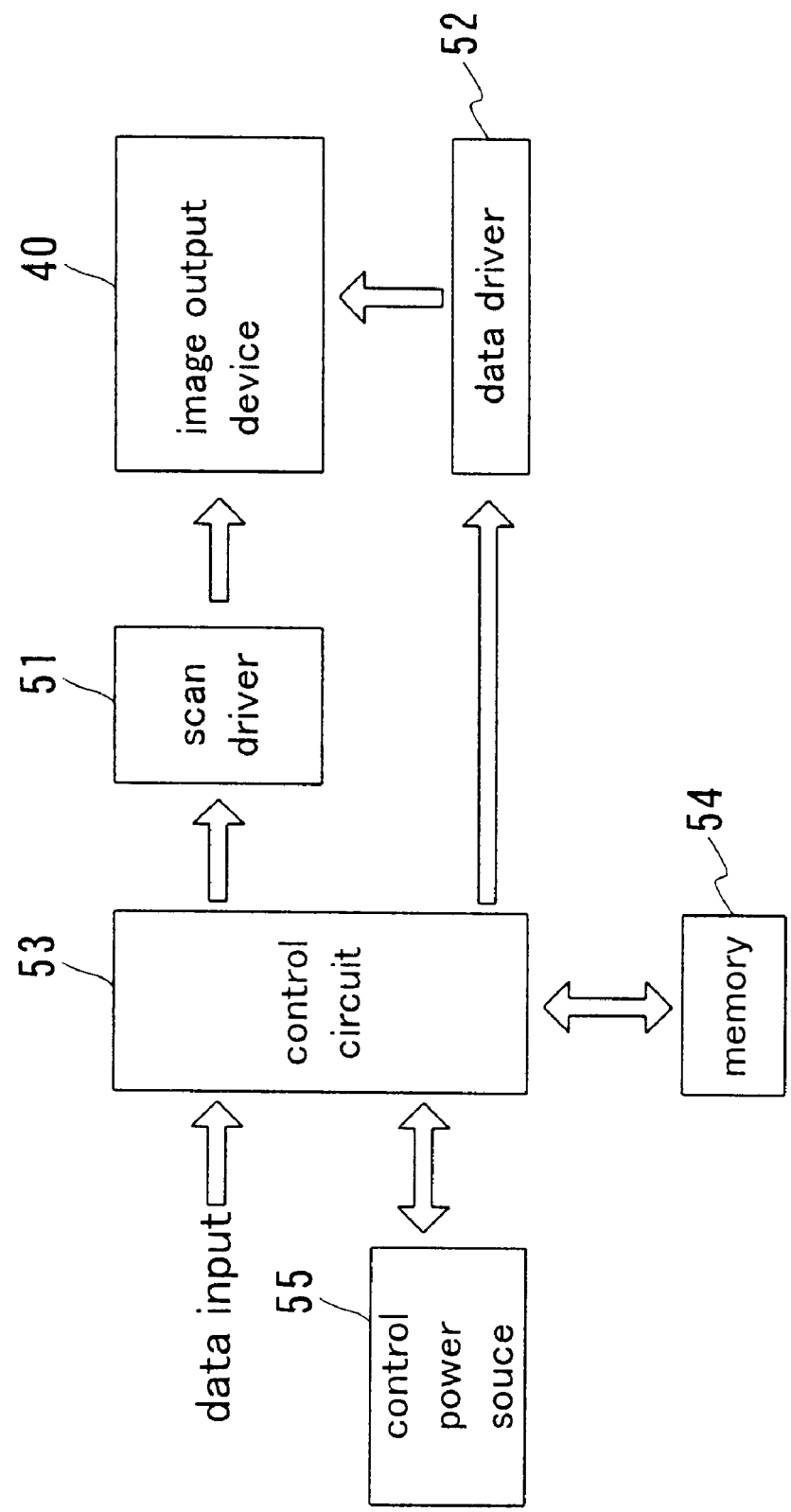
FIG. 4 is a view showing an exemplary structure of a control system of the image output device according to the present invention.
Figure 5:
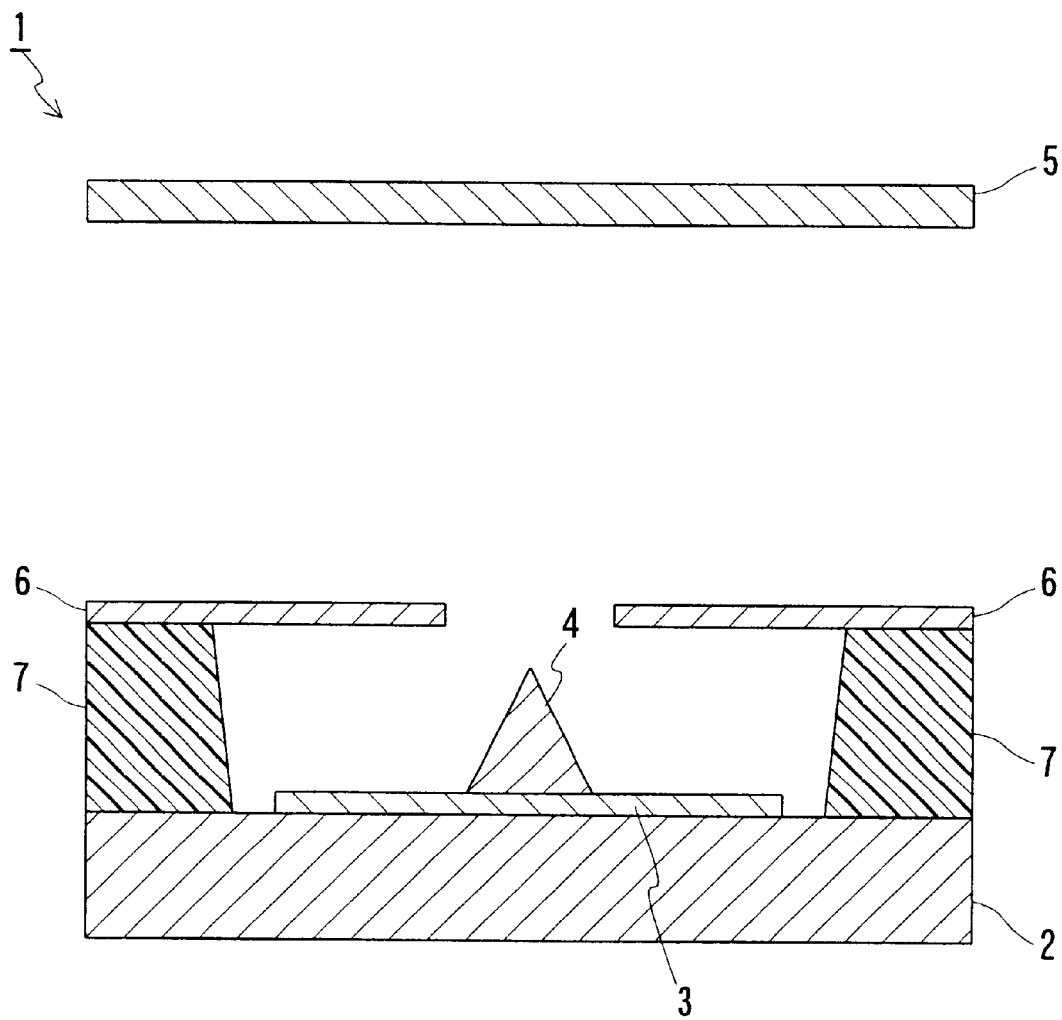
FIG. 5 is a cross-sectional view showing an example of a conventional electron emission element.
Figure 6:
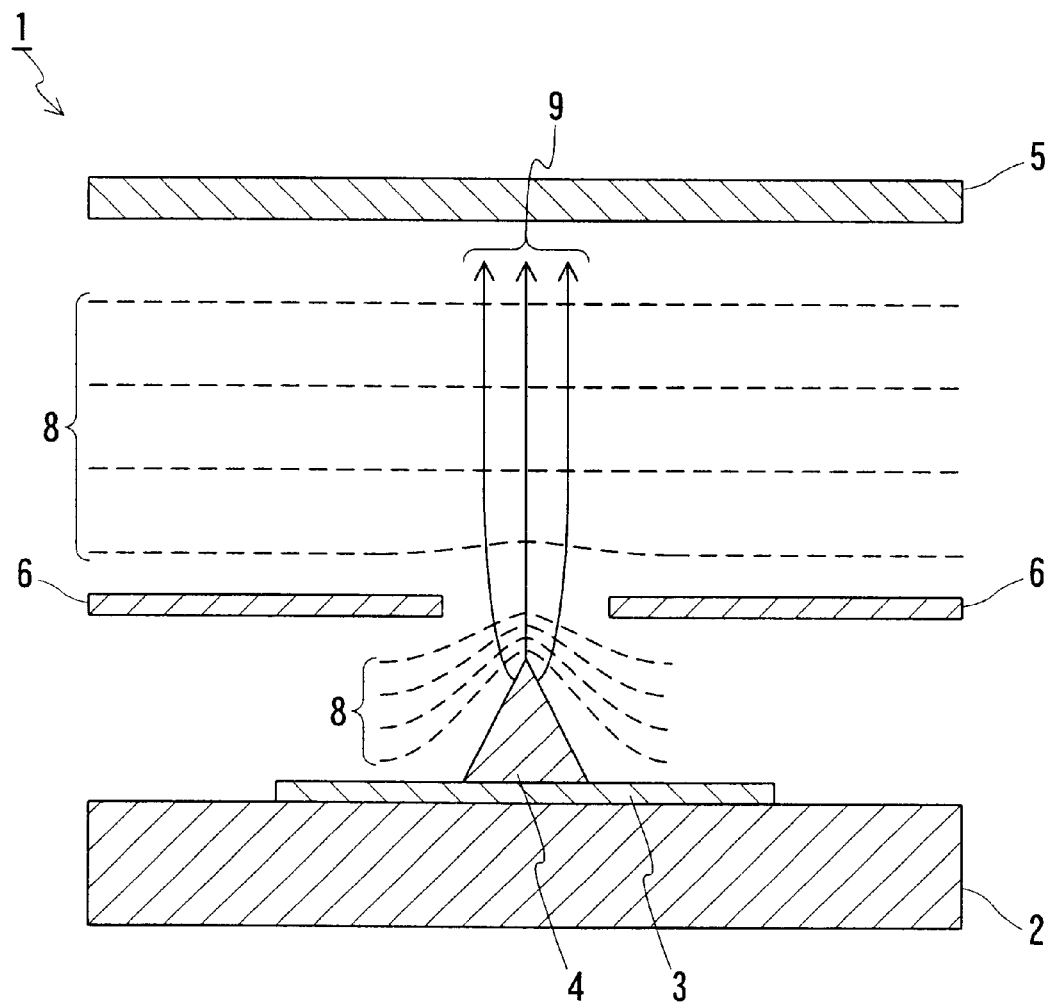
FIG. 6 is a schematic view showing a function of the electron emission element shown in FIG. 5.

Next, a method for controlling the image output device 40 will be described. FIG. 4 schematically shows a control system of the image output device 40. A scan driver 51 is electrically connected to the control electrodes 48 of the image output device 40. The scan driver 51 applies a scanning signal, for successively driving m rows of control electrodes 48 one by one, to the control electrodes 48.

On the other hand, a data driver 52 is electrically connected to the cathodes 45 of the image output device 40. The data driver 52 applies a modulation signal (image signal) for controlling an emission amount of electrons to each of n columns of cathodes 45. In the image output device 40, an emission amount of electrons from each electron emission element 43 can be controlled by controlling the scanning signal and the modulation signal. Thus, in the image output device 40, the phosphor film 44 is allowed to emit light so as to correspond to a position of each electron emission element 43, whereby an image can be displayed.

The scan driver 51 and the data driver 52 are connected to a control circuit 53 for controlling them. Furthermore, the control circuit 53 is connected to a memory 54 and a control power source 55. The memory 54 is provided with a ROM (read-only memory) and a RAM (random-access memory) for storing programs and data. Furthermore, a power source (not shown) is connected to the cathodes 45 and the anode 46 of the image output device 40 for the purpose of applying a voltage required for emission of electrons.

Next, a method for driving the image output device 40 will be described. The scan driver 51 contains m switching elements. The switching elements switch on/off an output voltage that is output from a DC power source and applied to each control electrode 48. A value of the output voltage is selected so that a voltage applied to an electron emission member in a row not selected by scanning becomes a threshold voltage at which the electron emission member emits electrons or less. Each switching element of the scan driver 51 is switched based on a timing signal. Furthermore, an image signal input for drawing an image is converted to a pulse signal having a pulse width corresponding to the intensity of the image signal by the control circuit 53, and then is applied to the cathode 45 of the image output device 40 through the data driver 52. The electron emission members 14 under the control electrode 48 selected by the scan driver 51 emit electrons only for a period of time corresponding to a pulse width supplied from the data driver 52. More specifically, all the electron emission members 14 in the selected line (control electrode 48) emit electrons in accordance with an image signal. The emitted electrons allow the phosphor film 44 to emit light. Each line (control electrode 48) is successively scanned by the scan driver 51, whereby the image output device 40 displays a two-dimensional image.

The image output device 40 of Embodiment 2 is provided with the electron emission elements of Embodiment 1. More specifically, in the electron emission element 43 of the image output device 40 of one embodiment, the electric field intensity immediately above the electron emission member is smaller than that between the control electrode and the anode during operation. Furthermore, in the electron emission element 43 of the image output device 40 of another embodiment, the spatial average of the electric field intensity between the electron emission member and the control electrode is smaller than that between the control electrode and the anode. More specifically, a voltage required for the electron emission member to emit electrons is applied between the electron emission member and the anode. In the electron emission element 43, the electric potential of the control electrode is changed, whereby emission of electrons from the electron emission member is controlled. Thus, the image output device 40 is obtained, which is produced easily and enables a high-resolution display to be performed.

The image output device described in Embodiment 2 is an example. The image output device may have another structure, as long as it uses the electron emission element of the present invention.

According to another aspect, the present invention relates to a method for controlling the image output device 40. More specifically, the present invention relates to a method for controlling an image output device including a container that is substantially vacuum, and a plurality of electron emission elements disposed in a matrix in the container. The electron emission element includes a cathode, an anode opposed to the cathode, an electron emission member disposed on the cathode, and a control electrode disposed between the cathode and the anode. According to one control method, the electric intensity immediately above the electron emission member is set to be lower than that between the control electrode and the anode during operation. According to another control method, the spatial average of an electric field intensity between the electron emission member and the control electrode is set to be smaller than that between the control electrode and the anode. According to these control methods, a voltage required for the electron emission member to emit electrons is applied between the electron emission member and the anode to change the electric potential of the control electrode, whereby electron emission from the electron emission member is controlled. The image output device used in these control methods is produced easily. Furthermore, according to these control methods, emitted electrons are highly focused, so that a high-resolution image can be displayed.

EXAMPLES

Hereinafter, the present invention will be described by way of illustrative examples.

Example 1

An example of a method for producing an electron emission element of Embodiment 1 will be described. In Example 1, a phosphor film was formed on an anode for the purpose of measurement.

First, a cathode was formed on a glass substrate. Then, an electron emission member was formed on the cathode. A metal layer to be the cathode was formed by depositing aluminum (Al) by vacuum evaporation. The electron emission member was produced by dispersing diamond particles (mean particle diameter: 0.1 $\mu$m) in a vehicle (main component: isobutyl methacrylate) to prepare diamond ink, and coating the cathode with the diamond ink by screen printing. The electron emission member was formed in a circular shape with a diameter of about 50 $\mu$m.

Furthermore, an insulating layer-was formed on the cathode. A metal film to be a control electrode was formed on the insulating layer. An aperture with a diameter of about 60 $\mu$m was formed in the control electrode.

The distance between the control electrode and the electron emission member was set to be about 100 $\mu$m. Thus, a lower panel was produced.

On the other hand, an anode and a phosphor film were formed on a glass substrate to produce an upper panel. A transparent conductive film (ITO) was used for the anode, and ZnO (containing Zn as an activator) was used for the phosphor film.

The upper and lower panels produced by the above-mentioned process were attached to each other with an insulating spacer (height: 1 mm) interposed therebetween. The distance between the electron emission member and the anode was about 1 mm. Thus, an electron emission element was produced.

The electron emission element thus obtained was placed in a vacuum chamber of about $10^{-7}$ Torr. A positive voltage of 10 kV (vs. cathode) was applied to the anode. As a result, electrons were emitted from diamond particles (electron emission member) disposed on the cathode, whereby a large current flowed. Furthermore, the On/Off state of electron emission was able to be controlled by changing a voltage to be applied to the control electrode in a range of –0.1 kV to 0.1 kV (vs. cathode). The distribution of the electric field in a space between the cathode and the anode at this time was examined by simulation and measurement. Consequently, most of a space between the electron emission member and the control electrode has an electric field intensity smaller than that in the space between the anode and the control electrode. As a result of comparison, it was revealed that the spatial average of the electric field intensity between the electron emission member and the control electrode was ½ or less of that between the anode and the control electrode.

Furthermore, it was found that the equipotential surface in a space immediately above the electron emission member during electron emission was convex toward the electron emission member as shown in FIG. 2. Consequently, it was found that electron beams radiated to the anode were focused.

In Example 1, even in the case where molybdenum (Mo), niobium (Nb), or the like was used for the control electrode, results similar to the above were obtained. Furthermore, even in the case where the size and amount of diamond particles used for coating were changed, results similar to the above were obtained.

Example 2

An electron emission element was produced in the same way as in Example 1, except that a different material was used for the electron emission member. In Example 2, a material containing carbon nanotubes was used for the electron emission member.

First, DC arc discharge was allowed to occur between electrodes made of carbons in a helium (He) gas atmosphere. At this time, a material containing carbon nanotubes was collected from a deposit on the negative electrode. Discharge conditions were He pressure: 40 Torr, purity of a carbon electrode: 99.999%, DC arc discharge voltage: 25 volts, and emission current: 300 A. A number of carbon nanotubes are generally present in a columnar structure portion in the deposit on the negative electrode, so that only this part was collected and pulverized in a mortar. Thus, the material containing carbon nanotubes was obtained. The content of the carbon nanotubes in this sample was 5% to 10% by volume. The material containing carbon nanotubes was dispersed in a vehicle (main component: isobutyl methacrylate) to prepare carbon nanotube ink. The cathode was coated with the ink by screen printing, whereby an electron emission member was produced.

Thereafter, in the same way as in Example 1, upper and lower panels were produced and attached to each other to obtain an electron emission element. The electron emission element was placed in a vacuum chamber, and measured for electron emission characteristics.

As a result, when a positive voltage of 10 kV (vs. cathode) was applied to the anode, electrons were emitted from the material containing carbon nanotubes (electron emission member) disposed on the cathode, and an emission current larger than that in Example 1 was observed. Furthermore, when a voltage of –0.1 kV to 0.1 kV (vs. cathode) was applied to the control electrode, the On/Off state of electron emission was able to be controlled.

The distribution of the electric field in a space between the cathode and the anode was examined by simulation and measurement. Consequently, it was found that most of a space between the electron emission member and the control electrode has an electric field intensity smaller than that in a space between the anode and the control electrode. As a result of comparison, it was revealed that the spatial average of the electric field intensity between the electron emission member and the control electrode was ½ or less of that between the anode and the control electrode.

Furthermore, it was found that the equipotential surface in a space immediately above the electron emission member during electron emission was convex toward the electron emission member as shown in FIG. 2. Consequently, it was found that electron beams radiated to the anode were focused.

In Example 2, the material containing carbon nanotubes in an amount of 5% to 10% by volume was used for the electron emission member. However, materials containing carbon nanotubes in an amount of 1% by volume or more can be used for the electron emission member. By using a material containing carbon nanotubes in such an amount, carbon nanotubes can be placed in the electron emission member with a certain minimum probability, and the amount of emission current sufficient for practical use can be obtained from the electron emission member by application of an electric field.

Example 3

An electron emission element was produced in the same way as in Example 1, except that a different material was used for the electron emission member. In Example 3, a purified material containing carbon nanotubes was used for the electron emission member.

First, DC arc discharge was allowed to occur between electrodes made of carbons in a helium (He) gas atmosphere under the same conditions as those in Example 2. At this time, a deposit (containing carbon-nanotubes) on the negative electrode was collected. Thereafter, a columnar structure portion was collected from the deposit thus obtained, and pulverized in a mortar. The resultant powder was mixed with ethanol, and crushed and dispersed by vibration with ultrasonic wave. The ethanol dispersion was subjected to centrifugation, whereby carbon nanotubes were separated from the other components. A supernatant obtained after centrifugation was collected. The supernatant was dried to obtain a purified material containing carbon nanotubes. Due to the purification, the content of carbon nanotubes in the material containing carbon nanotubes increased to 40% to 60% by volume. The material containing carbon nanotubes thus obtained was dispersed in a vehicle (main component: isobutyl methacrylate) in the same way as in Example 2 to produce carbon nanotube ink. The cathode was coated with the ink by screen printing, whereby an electron emission member was produced.

Thereafter, in the same way as in Example 1, upper and lower panels were produced and attached to each other, whereby an electron emission element was produced. The electron emission element was placed in a vacuum chamber, and measured for electron emission characteristics.

As a result, when a voltage was applied to the anode in the same way as in the above examples, electrons were emitted from the material containing carbon nanotubes. Furthermore, when a voltage of 0 kV to 0.05 kV (vs. cathode) was applied to the control electrode, the On/Off state of electron emission was able to be controlled.

In Example 3, the case has been described, where the electron emission member was produced only by using a purified material containing carbon nanotubes. However, even in the case where other materials were mixed with the material containing carbon nanotubes so as to adjust the content thereof to 1% to 50% by volume, results similar to the above were obtained. Various materials that do not denature carbon nanotubes can be mixed with the material containing carbon nanotubes. More specifically, carbon materials such as graphite, fullerene, diamond-like carbon, and diamond can be mixed. Carbides of elements such as tungsten (W), molybdenum (Mo), chromium (Cr), tantalum (Ta), niobium (Nb), vanadium (V), zirconium (Zr), titanium Mi), nickel (Ni), boron (B), nitrogen (N), and silicon (Si) also can be mixed. Furthermore, carbides of elements such as gold (Au), silver (Ag), copper (Cu), platinum (Pt), and aluminum (Al) can be mixed.

Example 4

An electron emission element was produced in the same way as in Example 1, except that a different material was used for the electron emission member. In Example 4, graphite having a fibrous shape was used for the electron emission member.

First, a powder of fibrous graphite was produced. Fibrous graphite was produced in the same way as carbon nanotubes in Example 2. In Example 4, in order to produce fibrous graphite, the pressure of He and an emission current were decreased during DC arc discharge. The fibrous graphite thus obtained was dispersed in a vehicle (main component: isobutyl methacrylate) to prepare a dispersion of fibrous graphite in the same way as in Example 1. The cathode was coated with the dispersion by screen printing to produce an electron emission member.

Thereafter, upper and lower panels were produced and attached to each other in the same way as in Example 1 to produce an electron emission element. The electron emission element was placed in a vacuum chamber and measured for electron emission characteristics.

As a result, in the same way as in the above-mentioned examples, electron emission from the fibrous graphite was observed by applying a voltage to the cathode, Furthermore, by changing a voltage applied to the control electrode, the On/Off state of electron emission was able to be controlled.

In Example 4, the case has been described where an electron emission member was produced by using fibrous graphite. However, even when other materials with a fibrous structure, such as carbon fiber, were used, results similar to the above were obtained.

Example 5

An image output device was produced by using, as an electron emission source, an electron emission element produced in any of the above-mentioned examples.

First, cathodes made of Al were formed on a glass substrate, and electron emission members used in any of the above-mentioned examples were formed in a matrix on the cathodes. The cathodes were formed by vacuum deposition and photolithography. Other methods may be used. The electron emission member was produced in the same way as in either of the above-mentioned examples.

Furthermore, an insulating layer made of silicon oxide was formed around the electron emission members, and control electrodes made of Mo were formed on the insulating layer. The insulating layer was formed by a sputtering or printing method, and the control electrodes were formed by vacuum deposition. The cathodes, the electron emission members, the insulating layer, and the control electrodes were formed so as to have shapes as shown in FIG. 3. Thus, a lower panel was produced. Thereafter, an upper panel was produced by the same method as that in the above-mentioned examples. Both the panels were attached to each other.

A voltage was independently applied to each control electrode under the application of a voltage to the cathode.

As a result, by changing a voltage to be applied to each control electrode, the On/Off state of electron emission from the electron emission member corresponding to each control electrode, and the amount of emitted electrons therefrom were able to be controlled.

Furthermore, by controlling a voltage to be applied to each control electrode, light emission of a phosphor film provided on the anode could be controlled two-dimensionally. More specifically, the inventors of the present invention confirmed that an image can be displayed by using a voltage applied to the control electrodes as an image signal.

Thus, the present invention has been described by way of illustrative embodiments. However, the present invention is not limited thereto, and is applicable to another embodiment based on the technical idea of the invention.

As described above, according to the present invention, an electron emission element is obtained, which is produced easily and emits highly focused electron beams. The electron emission element of the present invention can be used for an electron emission source for a flat display, a fluorescent display tube, an emitter portion of a vacuum device, or the like.

Furthermore, according to the present invention, a high-resolution image output device is obtained, which is produced easily.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An electron emission element, comprising: a cathode; an anode opposed to the cathode; an electron emission member disposed on the cathode; and a control electrode disposed between the cathode and the anode, wherein, during emission of electrons, an equipotential surface in a space immediately above the electron emission member has a curvature that is convex toward the electron emission member and an electric field intensity immediately above the electron emission member is lower than electric field intensity between the control electrode and the anode.

2. An electron emission element according to claim 1, wherein a voltage required for the electron emission member to emit electrons is applied between the electron emission member and the anode, and emission of electrons from the electron emission member is controlled by changing an electric potential of the control electrode.

3. An electron emission element according to claim 1, wherein the electron emission member is a thin film.

4. An electron emission element according to claim 1, wherein the electron emission member contains an allotrope of carbon.

5. An electron emission element according to claim 4, wherein the allotrope includes diamond.

6. An electron emission element according to claim 4, wherein the allotrope includes an allotrope of carbon having a graphene structure.

7. An electron emission element according to claim 4, wherein the allotrope includes a carbon nanotube.

8. An image output device comprising a substantially vacuum container and a plurality of electron emission elements disposed in a matrix in the container, wherein the electron emission element is an electron emission element of claim 1, and the device further comprises a phosphor film disposed between the electron emission member and the anode.

9. An image output device according to claim 8, wherein a voltage required for the electron emission member to emit electrons is applied between the electron emission member and the anode, and emission of electrons from the electron emission member is controlled by changing an electric potential of the control electrode.

10. An image output device according to claim 8, wherein, during emission of electrons, an equipotential surface in a space immediately above the electron emission member has a curvature that is convex toward the electron emission member.

11. An image output device according to claim 8, wherein the electron emission member is a thin film.

12. An image output device according to claim 8, wherein the electron emission member contains an allotrope of carbon.

13. An image output device according to claim 12, wherein the allotrope includes diamond.

14. An image output device according to claim 12, wherein the allotrope includes an allotrope of carbon having a graphene structure.

15. An image output device according to claim 12, wherein the allotrope includes a carbon nanotube.

16. An electron emission element, comprising: a cathode; an anode opposed to the cathode; an electron emission member disposed on the cathode; and a control electrode disposed between the cathode and the anode, wherein, during emission of electrons, an equipotential surface in a space immediately above the electron emission member has a curvature that is convex toward the electron emission member and a spatial average of an electric field intensity between the electron emission member and the control electrode is lower than a spatial average of an electric field intensity between the control electrode and the anode.

17. An electron emission element according to claim 16, wherein a voltage required for the electron emission member to emit electrons is applied between the electron emission member and the anode, and emission of electrons from the electron emission member is controlled by changing an electric potential of the control electrode.

18. An electron emission element according to claim 15, wherein the electron emission member is a thin film.

19. An electron emission element according to claim 15, wherein the electron emission member contains an allotrope of carbon.

20. An electron emission element according to claim 19, wherein the allotrope includes diamond.

21. An electron emission element according to claim 19, wherein the allotrope includes an allotrope of carbon having a graphene structure.

22. An electron emission element according to claim 19, wherein the allotrope includes a carbon nanotube.

23. An image output device comprising a substantially vacuum container and a plurality of electron emission elements disposed in a matrix in the container, wherein the electron emission element is an electron emission element of claim 17, and the device further comprises a phosphor film disposed between the electron emission member and the anode.

24. An image output device according to claim 23, wherein a voltage required for the electron emission member to emit electrons is applied between the electron emission member and the anode, and emission of electrons from the electron emission member is controlled by changing an electric potential of the control electrode.

25. An image output device according to claim 23, wherein, during emission of electrons, an equipotential surface in a space immediately above the electron emission member has a curvature that is convex toward the electron emission member.

26. An image output device according to claim 23, wherein the electron emission member is a thin film.

27. An image output device according to claim 23, wherein the electron emission member contains an allotrope of carbon.

28. An image output device according to claim 27, wherein the allotrope includes diamond.

29. An image output device according to claim 27, wherein the allotrope includes an allotrope of carbon having a graphene structure.

30. An image output device according to claim 27, wherein the allotrope includes a carbon nanotube.

* * * * *